United States Patent [19]

Lippold

[11] Patent Number: 5,046,716
[45] Date of Patent: Sep. 10, 1991

[54] LIGHTTIGHT FILM BOX HAVING A FILM CLASPING TRAY

[75] Inventor: Steven R. Lippold, Oakfield, N.Y.
[73] Assignee: Eastman Kodak Company, Rochester, N.Y.
[21] Appl. No.: 451,400
[22] Filed: Dec. 15, 1989

Related U.S. Application Data

[63] Continuation-in-part of Ser. No. 304,085, Jan. 31, 1989, Pat. No. 4,948,113.

[51] Int. Cl.$^5$ .......................... B65H 31/04; B65H 1/00
[52] U.S. Cl. .................................. 271/214; 271/213; 271/163; 378/188
[58] Field of Search ................. 271/8.1, 145, 163, 207, 271/213, 214; 378/173, 182, 188

[56] References Cited

U.S. PATENT DOCUMENTS

| | | |
|---|---|---|
| 1,458,166 | 6/1923 | Cox . |
| 1,966,351 | 7/1934 | Lewis . |
| 3,961,723 | 6/1976 | Eckel . |
| 4,434,501 | 2/1984 | Pfeiffer . |
| 4,496,050 | 1/1985 | Kirchner et al. . |
| 4,870,285 | 9/1989 | Ohgoda ............................... 378/182 |
| 4,887,284 | 12/1989 | Bauer et al. ......................... 378/173 |
| 4,889,233 | 12/1989 | Torii .................................... 378/182 |
| 4,895,357 | 1/1990 | Lippold ............................... 271/8.1 |
| 4,948,113 | 8/1990 | Lippold et al. ...................... 271/8.1 |

FOREIGN PATENT DOCUMENTS 88-09525 12/1988 World Int. Prop. O. .......... 378/182

Primary Examiner—Robert P. Olszewski
Assistant Examiner—Steven Reiss
Attorney, Agent, or Firm—William F. Noval

[57] ABSTRACT

A lighttight box, for automatically delivering a photosensitive sheet of photographic film to an exposure station, and for positively removing the film from the exposure station and returning it to the box. The box includes a lid movable between a closed lighttight position and a fully open position. A clamshell film-carrying mechanism, connected to the lid, is mounted for movement, in a film delivery mode, from a closed position internal to the box when the lid is in its lighttight position, to an open film-delivery position external to the box when the lid is in its fully open position, and, in a film removal mode, from an open position, in which the clamshell mechanism clasps the rear edge of the film, to a closed position, in which the film is positively removed from the station and the film is replaced in the box.

4 Claims, 10 Drawing Sheets

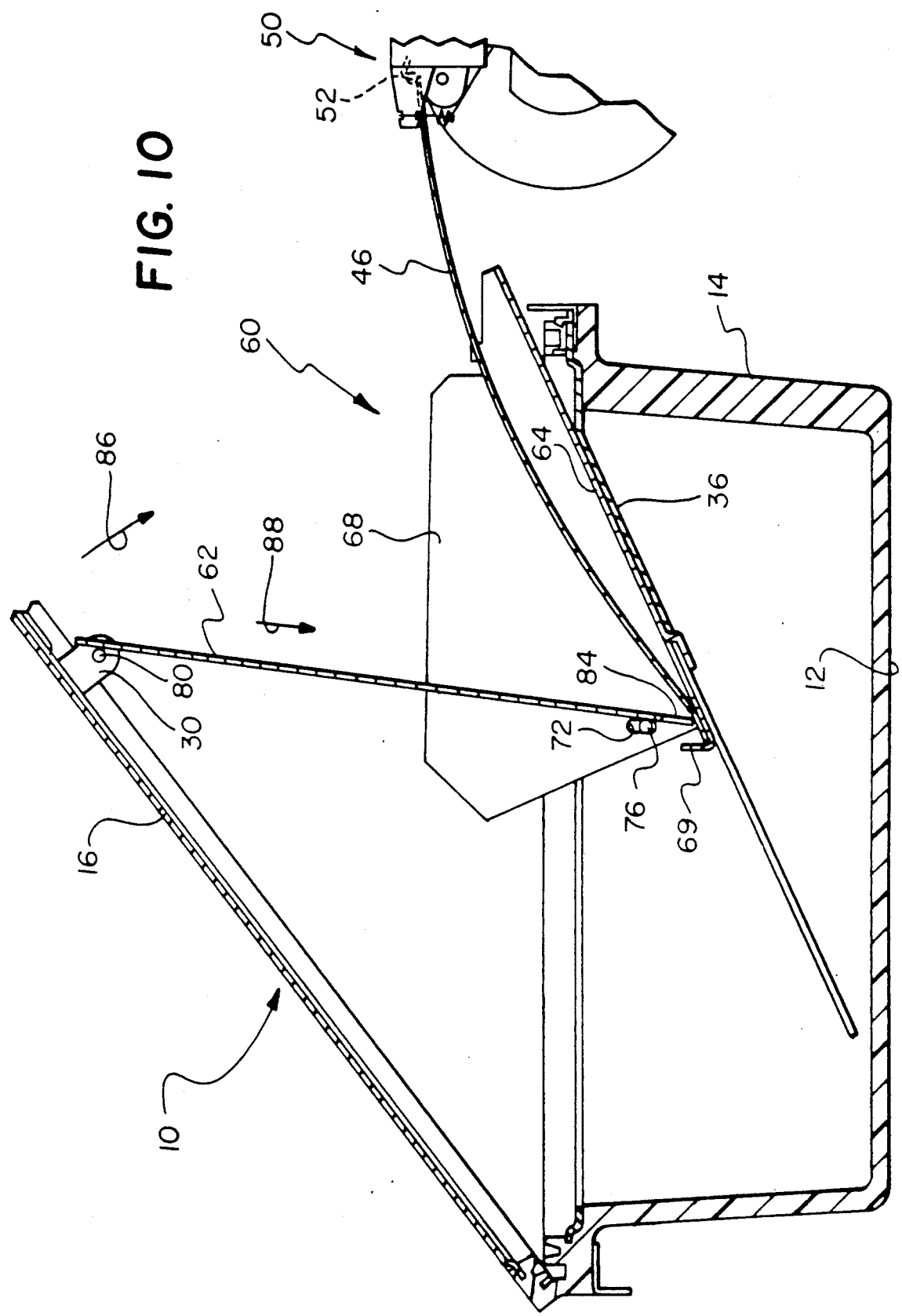

LIGHTTIGHT FILM BOX HAVING A FILM CLASPING TRAY

CROSS REFERENCE TO RELATED APPLICATIONS

This application is a continuation-in-part application of copending U.S. Pat. Application Ser. No. 07/304,085, filed Jan. 31, 1989, in the name of Steven Lippold and Matthew Branca, and entitled A LIGHTTIGHT FILM-DELIVERY BOX, which issued Aug. 14,1990 as U.S. Pat. No. 4,948,113.

Reference is also made to U.S. Pat. No. Application Ser. No. 07/304,094 filed on Jan. 31, 1989 in the name of S. Lippold and entitled LIGHTTIGHT FILM-DELIVERY BOX AND ACTUATOR APPARATUS THEREFOR which issued Jan. 23, 1990 as U.S. Pat. No. 4,895,357.

BACKGROUND OF THE INVENTION

1. Field Of The Invention

The present invention relates generally to apparatus for handling sheet material. More particularly, the invention relates to a lighttight box for delivering a photosensitive sheet to a workstation and for positively removing the sheet from the workstation and returning it to the box.

2. Description of the Related Art

Many applications require the delivery (and removal) of a flexible photosensitive sheet to a workstation, for example an exposure station. Apparatus, such as an electrostatic copier, a facsimile machine, color image reproduction apparatus, etc., often employs an exposure station in the form of a drum-type mechanism that automatically receives a photosensitive sheet of paper or film for an exposing operation.

Prior to an exposure, a photosensitive sheet needs to be handled in the dark or at least a low-light environment. A lack of light can be particularly troublesome to an operator during a loading operation, particularly if a photosensitive sheet is required to be mounted precisely for an exposure. This problem is alleviated significantly if the operator is required merely to place the photosensitive sheet into a lighttight sheet-delivery box or the like, which then delivers the sheet to a precise position at an exposure station. An operator can accomplish the initial sheet-loading task with relative ease when there is no need for precision placement of the sheet in the box other than a general alignment and orientation, i.e. width versus length and proper side up.

Those skilled in the art understand that a photosensitive sheet should be carefully handled, whether by sheet-delivery apparatus or by an operator, so as not to damage, by scratching, gouging, smudging, etc., its light-sensitive surface. Accordingly, a further desirable feature of lighttight sheet-delivery apparatus is that it be of the type that delivers the sheet automatically to a workstation without the need to engage, contact or otherwise handle its light-sensitive surface.

After a photosensitive sheet has been processed at the workstation, it is desirable that the sheet be positively removed from the workstation and completely returned to the lighttight box. Although U.S. Pat. No. 4,434,501, issued Feb. 28, 1984, patentee W. Ffeiffer discloses an X-ray film cassette having a pressure plate which causes an edge region of X-ray film to project beyond the cassette when the lid is opened, there is no disclosure in this patent of structure within the cassette for positively removing the X-ray film from a workstation and returning it to the cassette.

SUMMARY OF THE INVENTION

In view of the foregoing, an object of the invention is to provide apparatus for automatically delivering and removing a photosensitive sheet relative to a workstation in a manner that obviates the need for handling the portion of the light-sensitive surface of the sheet to be exposed to an image.

This object is achieved by a lighttight box enclosing a photosensitive sheet, a major surface of the box being movable from a closed lighttight position to a box-opening position. A tray carries the enclosed sheet with its light-sensitive surface facing outwardly, away from the tray. A linkage, coupling the tray and the movable major surface, is hinged to the tray to cooperatively form a clamshell-like mechanism that traps the enclosed sheet. In a sheet delivery mode, the linkage moves the tray, in response to movement of the major surface from its closed position to its box-opening position, from an initial position internal to the box wherein the jaws of the clamshell are closed to a final sheet-delivery position external to the box wherein the clamshell jaws are open. In a sheet removal mode, the clamshell mechanism claps the rear edge of the photosensitive sheet and positively removes the sheet from the workstation and returns the sheet to the box as the lid is closed. Thus, the photosensitive sheet is delivered and removed relative to a workstation without handling its light-sensitive surface.

BRIEF DESCRIPTION OF THE DRAWINGS

The invention will be described with reference to the accompanying drawings, wherein:

FIGS. 8, 9, and 10 are cross-sectional elevational views of a lighttight film box, with the clamshell mechanism of FIG. 7, useful in illustrating operation in the sheet removal mode.

DETAILED DESCRIPTION OF A PREFERRED EMBODIMENT

Figure 1:
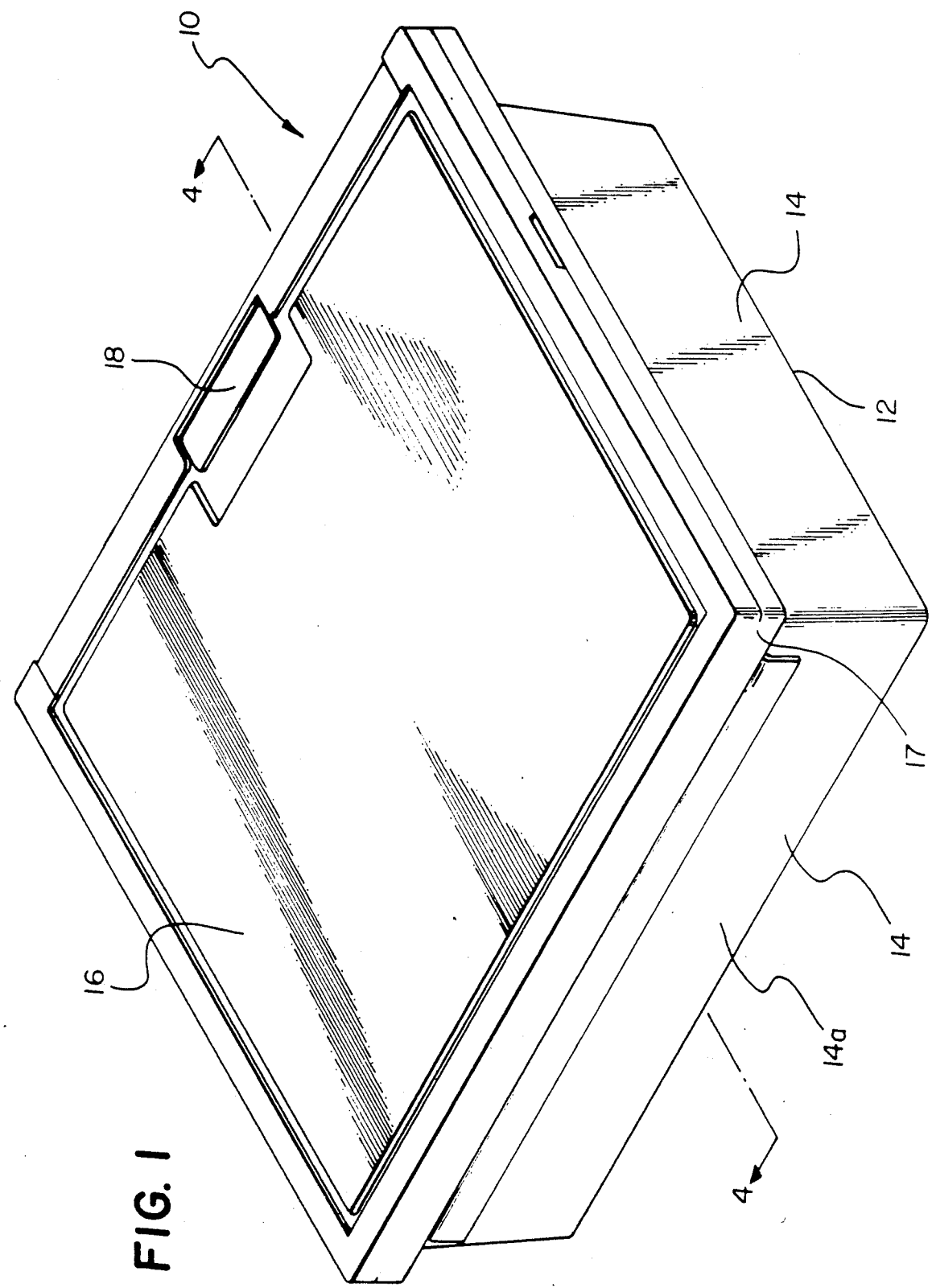
FIG. 1 is a perspective view of a lighttight box, in accordance with a preferred embodiment of the invention, in a closed position.

FIG. 1 shows a lighttight box 10, in accordance with a preferred embodiment of the invention, in a closed lighttight position. The box
of photographic film, of a size approximately 20 by 25 centimeters, to a film writer of color image reproduction apparatus (not shown). For that purpose, the box 10 forms a rigid rectangular receptacle having a flat bottom 12, four upright sides 14, and a cover or lid 16. A plastic molding, surrounding a peripheral edge of the lid 16, forms a living hinge 17 with the rearwardly facing side 14a of the box. A pivotal handle 18, located in a recess toward a forwardly facing edge of the lid 16, enables an operator to open the lid for placing a film sheet into, or removing the sheet from, the box 10.

Figure 2:
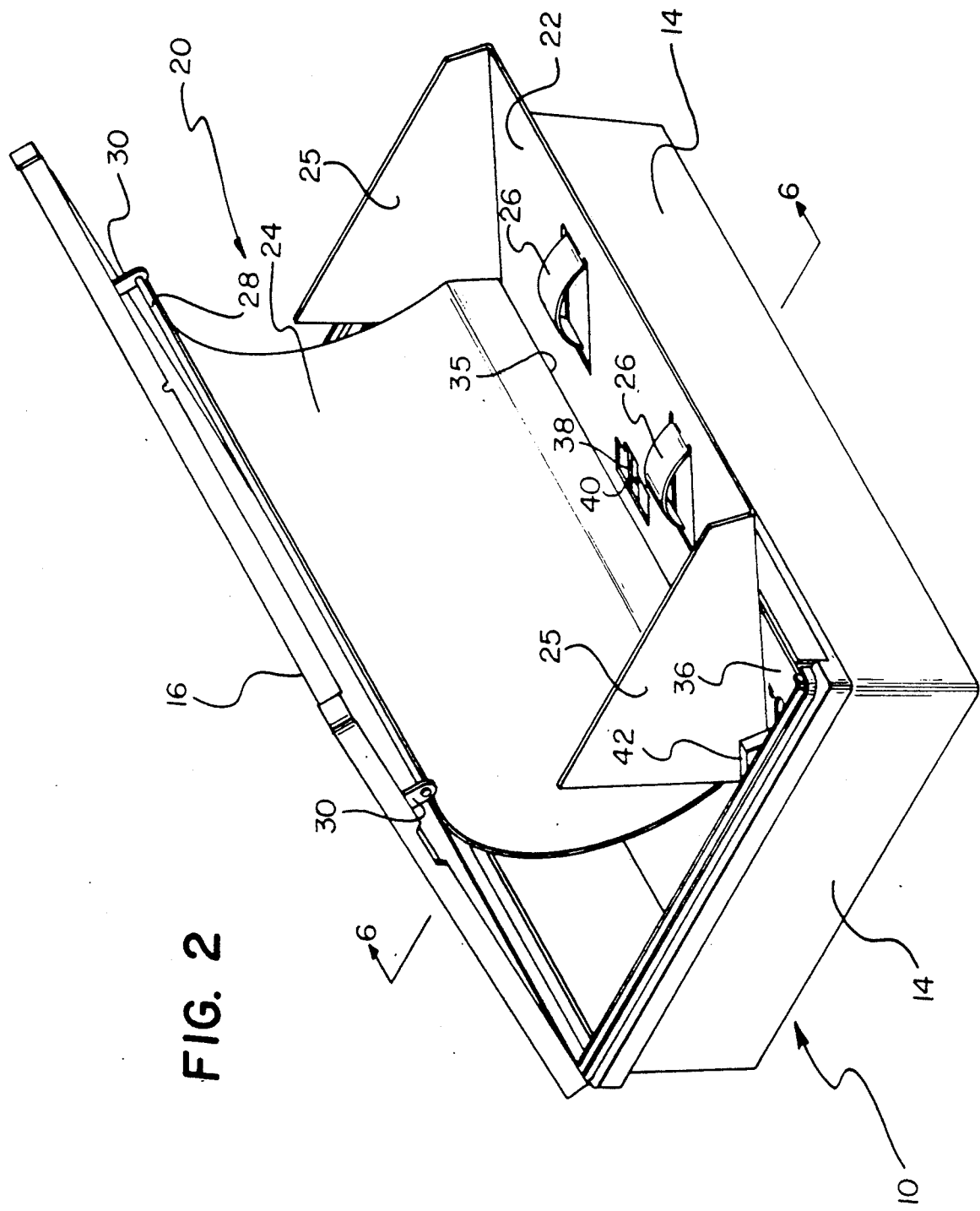
FIG. 2 is a perspective view of the lighttight box in an open position.

FIG. 2 shows the lid 16 in an open position. In its open position, the lid 16 uncovers a clamshell chute 20 which serves for delivering a film sheet to, or receiving the sheet from, a workstation such as the aforementioned film writer. An open-faced film-carrying tray 22 and a cooperating gently curved backing plate 24 form the respective jaws of the clamshell.

The tray 22 is made preferably of sheet metal. Opposite ends of the metal sheet are folded upwardly to form a pair of wing-like retaining sides 25 for centering a film sheet on the tray 22. A pair of curved rectangular bumps 26 serves, for a reason made apparent hereinafter, to lift a forwardly facing peripheral edge of film received when the box 10 is open.

Figure 3:
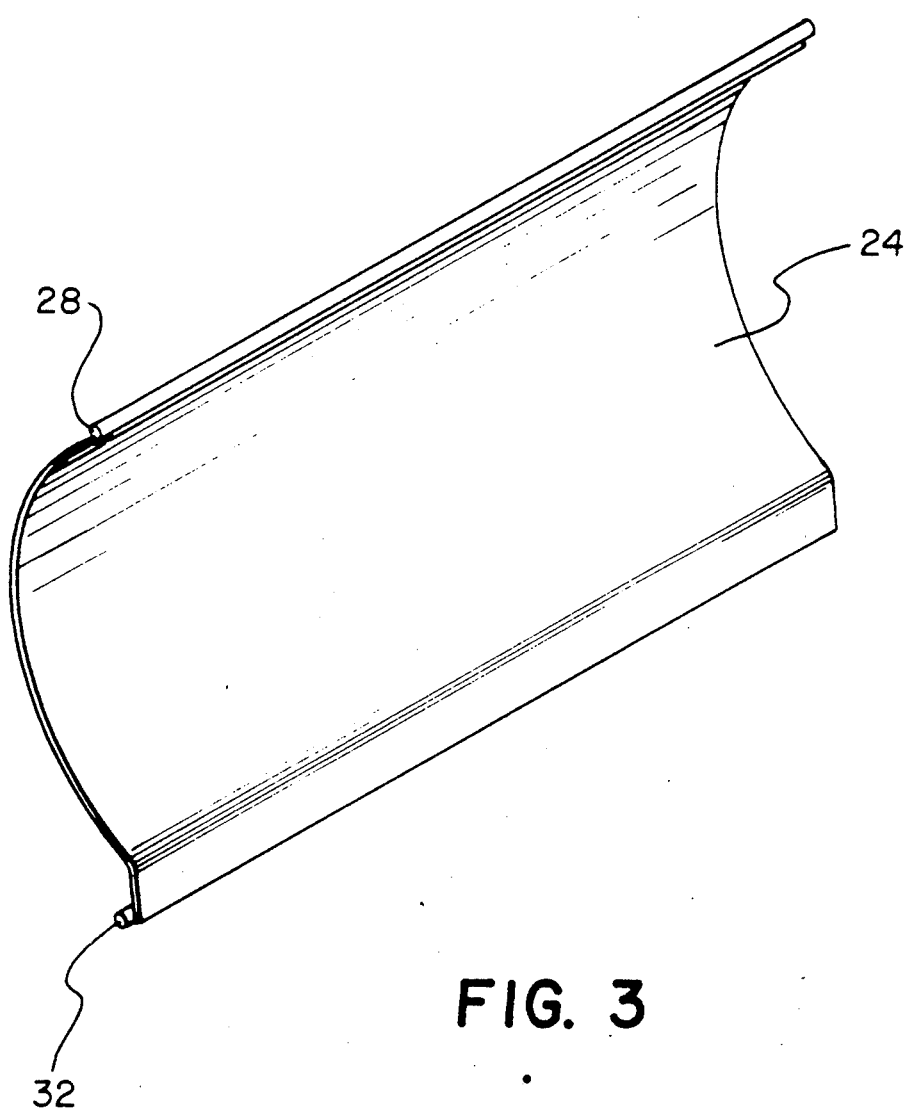
FIG. 3 is a perspective view of a curved backing plate of the box.

The backing plate 24, which is nested between the sides 25 and is shown by itself in FIG. 3, functions as a linkage coupling the lid 16 and the tray 22. To that end, a metal rod 28, preferably welded to the back of the plate 24 along its forwardly facing peripheral edge, serves as a hinge coupling the curved plate to the lid 16. For that purpose, opposing ends of the rod 28 are rotatably received in rounded holes formed in tabs 30 extending downwardly from opposite sides of the lid 16.

Figure 4:
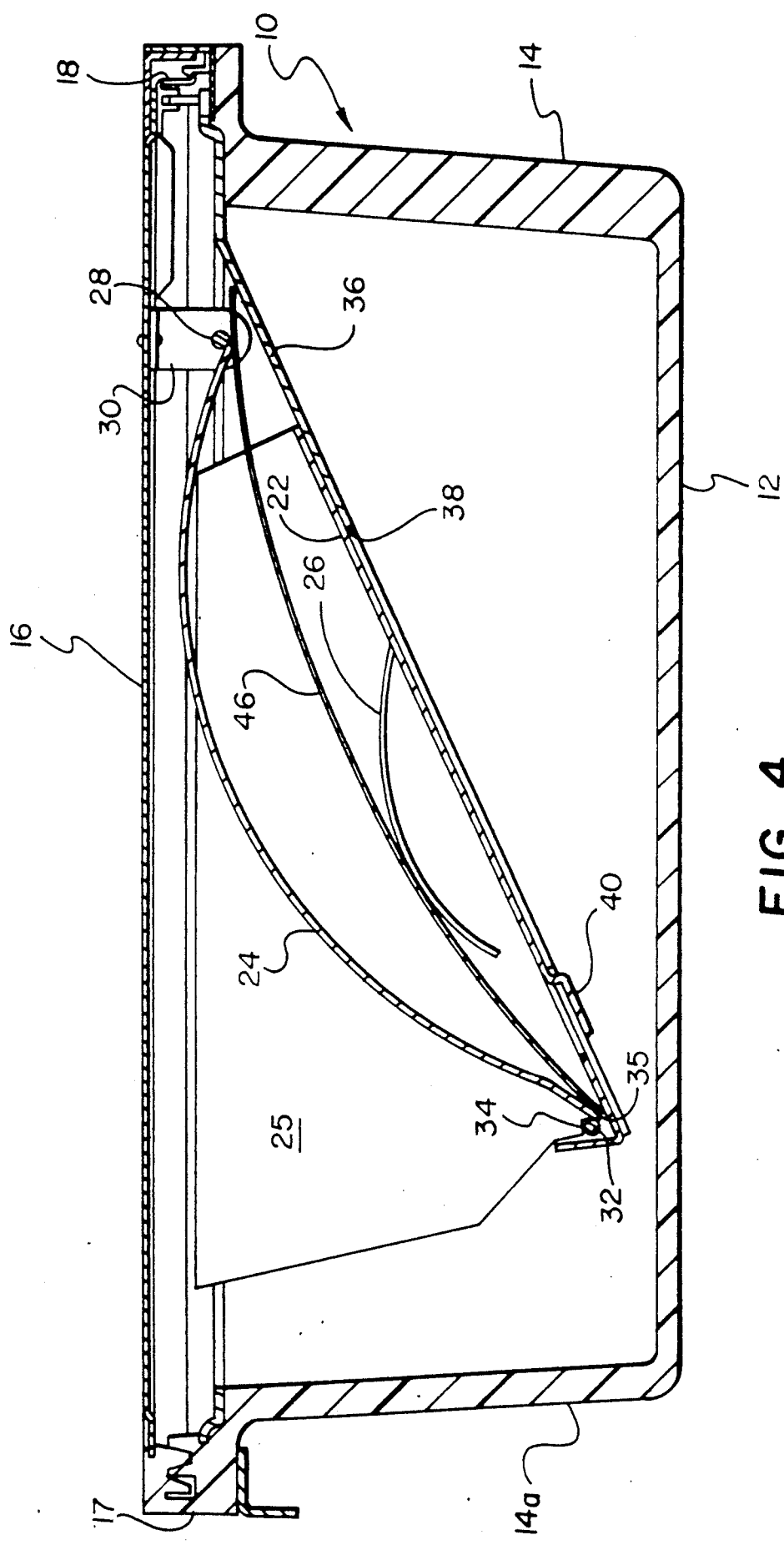
FIG. 4 is a cross-sectional view of the lighttight box taken along the lines 4—4 of FIG. 1.
Figure 6:
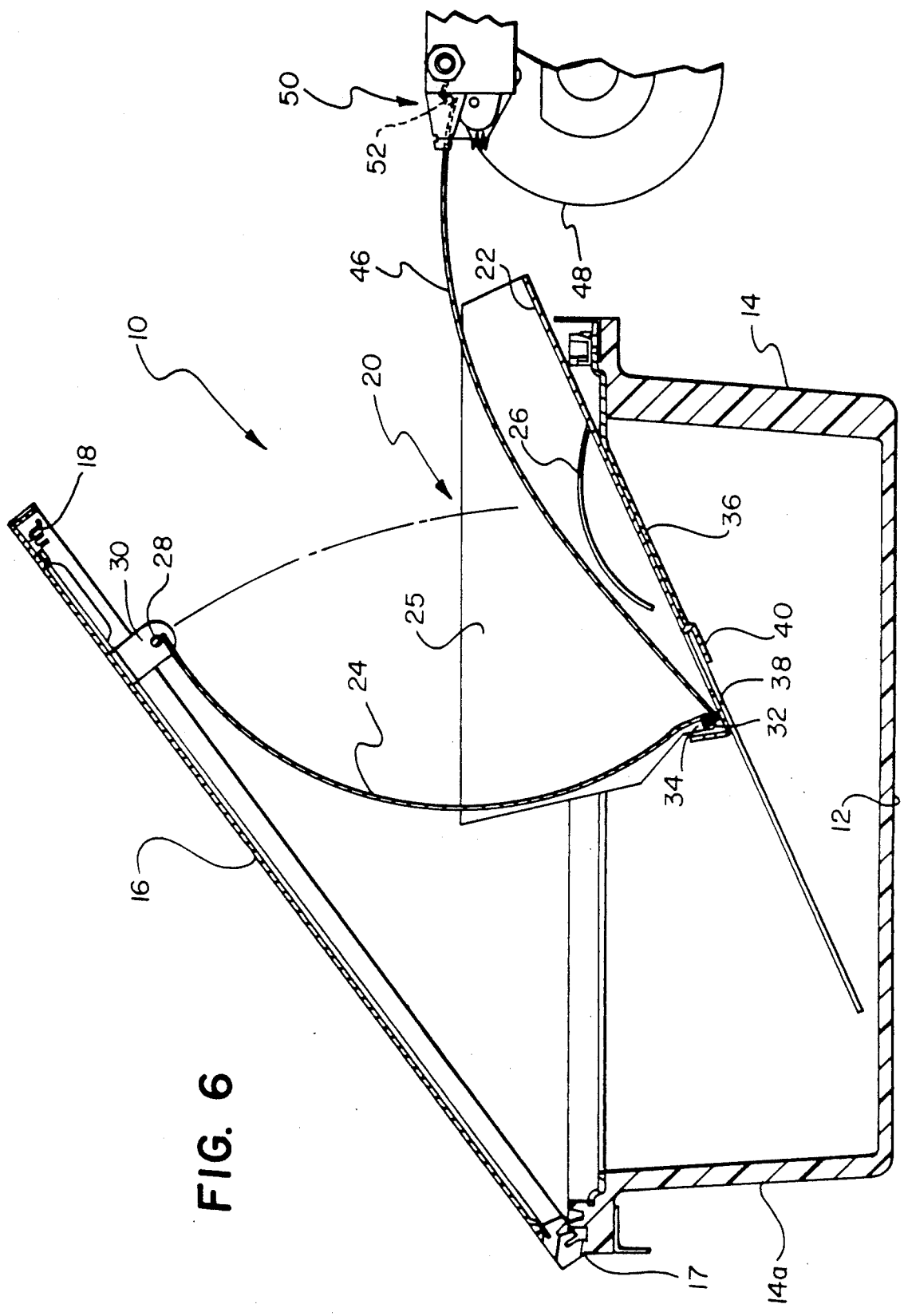
FIG. 6 is a cross-sectional view of the lighttight box taken along lines 6—6 of FIG. 2, showing the box delivering a sheet of photographic film to a rotatable drum of a film writer.

FIG. 3 further shows an elongate rod 32 welded to the back of the plate 24 along its downwardly or rearwardly facing edge. The rod 32, like the rod 28, serves as a hinge, only coupling the backing plate 24 to the tray 22. To that end, opposing ends of the rod 32 are rotatably seated in respective notches 34 cut from the lower rear corners of the sides 25 of the tray 22 (FIGS. 4 and 6). In doing so, the backing plate 24 and the tray 22 cooperatively form an elongate film trap 35 extending laterally along the lower back corner of the chute 20.

FIG. 4 shows the box 10 as having a stationary member 36 extending from the top front rim of the box linearly downwardly toward the lower back corner of the box. The member 36 functions as a ramp upon which the tray 22 slidably moves in response to opening and closing movement of the lid 16.

To that end, a tongue and groove combination serves for securing the tray 22 to the underside of the member 36. An elongate open-ended slot 38, cut from a central section in the lower half of the member 36, serves as the groove. A T-shaped central section 40 of the tray 22, between the bumps 26, is bent downwardly to form the tongue. The tongue 40 is somewhat wider than the slot 38 to hold the tray 22 against the member 36.

The chute 20 is biased laterally against a datum or reference point 42 for the purpose of accurately delivering film to a workstation. To that end, a coil spring 44, shown in FIGS. 5A and 5B, has opposing ends connected to corresponding sides of the tongue 40 and a depending tab 45 of the member 36.

In operation, an operator, in a suitable low- or no-light condition, opens the box 10 (FIG. 2) and inserts a peripheral edge of a photosensitive sheet of film into the trap 35. To that end, an operator positions the film in the box 10 with its light-sensitive surface facing upwardly. The film rests on the bumps 26 which only contact the back, non-photosensitive side of the film.

With film in the box 10 and the lid 16 open, the trap 35, which captures the back peripheral edge of the film 46, and the bumps 26 cooperatively serve to lift the front peripheral edge of the film above the plane of the tray 22.

After inserting the film, the operator closes the lid 16 (FIG. 4). In doing so, the front peripheral edge of the backing plate 24 pivots in the clockwise direction, as viewed in the drawing, about its hinge with the lid 16. As this pivoting movement occurs, the rod 32, welded to the backing plate 24, pulls the tray 22 linearly downwardly along the ramp-like member 36 into the box 10.

When the box 10 is closed, the jaws of the clamshell, i.e. the plate 24 and the tray 22, are closed; the front leading edge of the backing plate 24 and the ramp-like plate 36 trap the leading edge of the film 46 therebetween. As shown, the film 46 is held in place inside the box 10 in an arch-like configuration, with contact only being made to the photosensitive surface of the film and its front and trailing border areas.

FIG. 6 illustrates the reverse operation, i.e. when the box 10 is opened, such as when film 46 is delivered, for example, to a rotatable drum 48 of a film writer 50. For that purpose, the lid 16 is moved (by means not shown) from its closed lighttight position (FIG. 4) to its open position (FIG. 6). As this initial opening movement occurs, the leading edge of the backing plate 24 is released from the film 46. Due to its resiliency, the front peripheral edge of the film 46 springs upwardly, under the influence of the bumps 26 and the capturing action of the trap 35, away from the plane of the ramp-like member 36. In this cantilevered position, the film 46 remains slightly arched under the influence of its own weight.

Figure 5A:
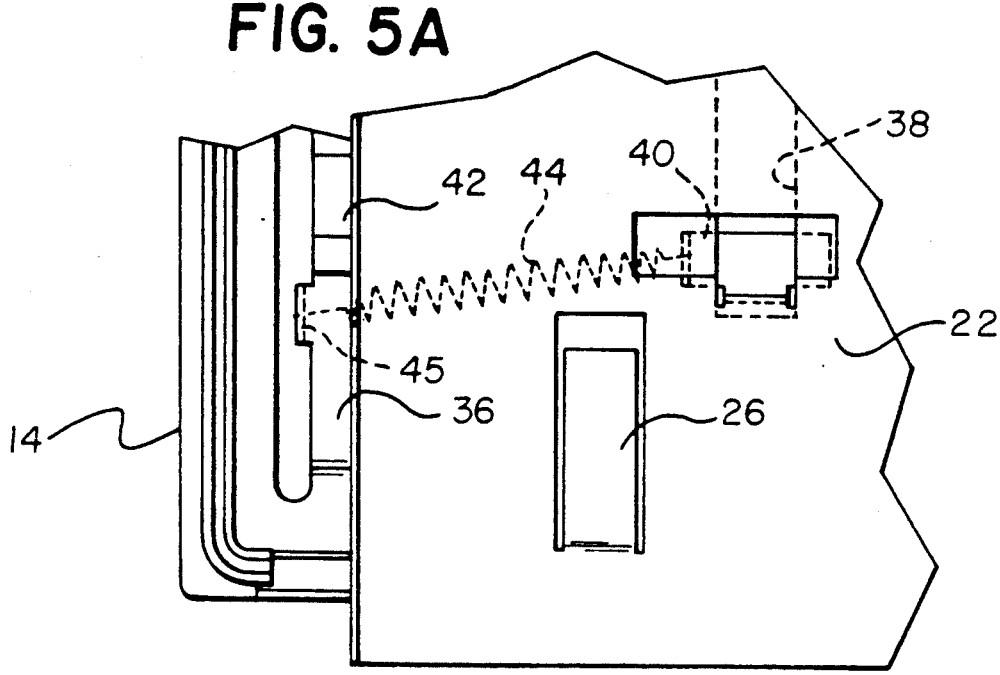
FIGS. 5A and 5B are partial top plan views of a film-carrying tray in an extended position and a retracted position, respectively.
Figure 5B:
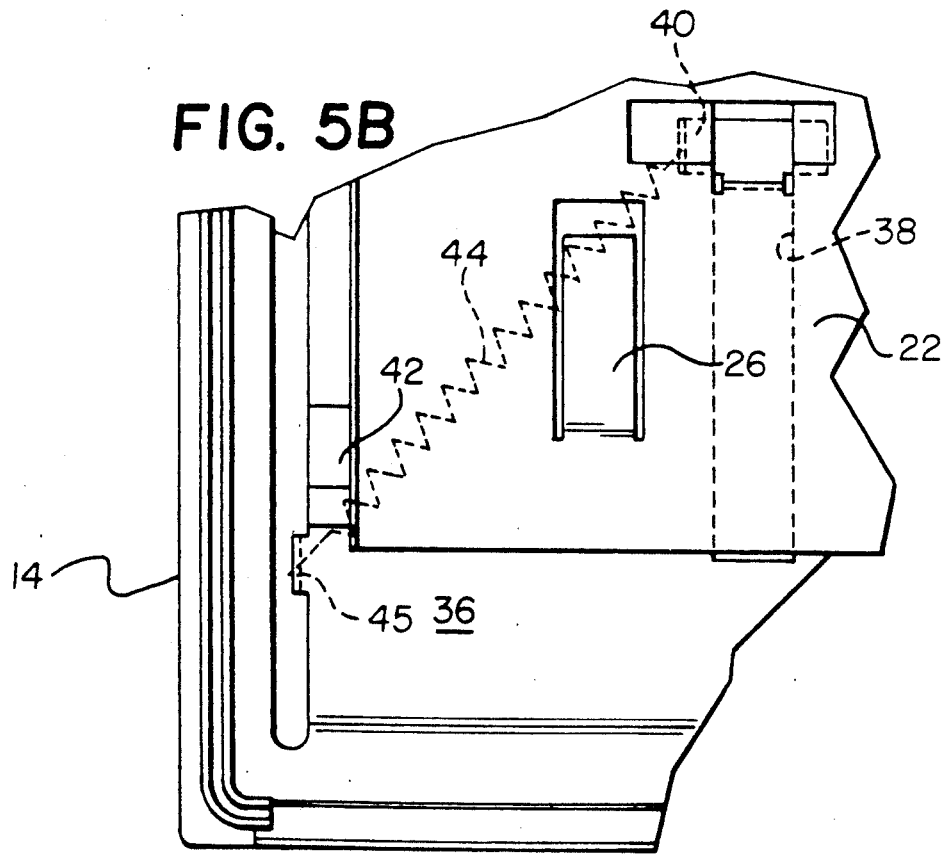

As box-opening movement continues, the lid 16 pulls the leading edge of the backing plate 24 upwardly along a circular path, shown in phantom. At the same time, the tray 22, which is held against the underside of the member 36 by means of the tongue 40, is pushed forwardly, under the influence of circular swinging movement of the plate 24, along the ramp-like member 36. In doing so, coil spring 44 biases the tray 22 laterally against datum 42 (FIGS. 5A and 5B).

The film 46 is wider than the front-to-back dimension of the tray 22. Accordingly, the leading peripheral edge of the film 46 leads the corresponding edge of the tray 22 as the clamshell chute 20 opens. With the lid 16 in its fully open position, the tray 22 extends outwardly from the box 10. The film 46, of course, extends not only beyond the leading edge of the tray 22, but is raised relative thereto under the influence of the bumps 26. This facilitates entry of the peripheral edge of the film 46 into the nip of a leading-edge clamp 52 of the film writer 50 (FIG. 6). Reference is hereby made to U.S. Pat. No. 4,807,867, entitled SHEET HANDLING APPARATUS, issued Feb. 28, 1989, and assigned to the assignee of the subject invention, for descriptive details of how film writer 50 loads the film sheet onto the drum 48 for an exposure and, in turn, returns the film, for example, to the tray 22, following an exposure.

Apparatus for automatically opening the box 10 forms no part of the present invention and, accordingly, a description of such apparatus is not included herein. Reference, however, is made to the aforementioned U.S. Pat. Application Ser. No. 07/304,094 entitled LIGHTTIGHT FILM-DELIVERY BOX AND ACTUATOR APPARATUS THEREFOR now U.S. Pat. No. 4,895,357 for a detailed description of appropriate apparatus interfacing with the box 10 to effect film delivery to a film writer.

From the foregoing, it will be clear to those skilled in the art that box 10 as described and shown with respect to FIGS. 1-6 offers clear and distinct advantages for delivering a sheet of film to a workstation. For example, by arching the film and raising it relative to the mouth of a clamshell film-delivering chute, design tolerances can be relaxed for parking the box relative to a workstation when the film is actually delivered thereto; moreover, by arching a film sheet, its full leading edge can be moved more readily into abutting engagement with a receiving surface of a workstation if the sheet is misaligned on delivery.

Figure 7:
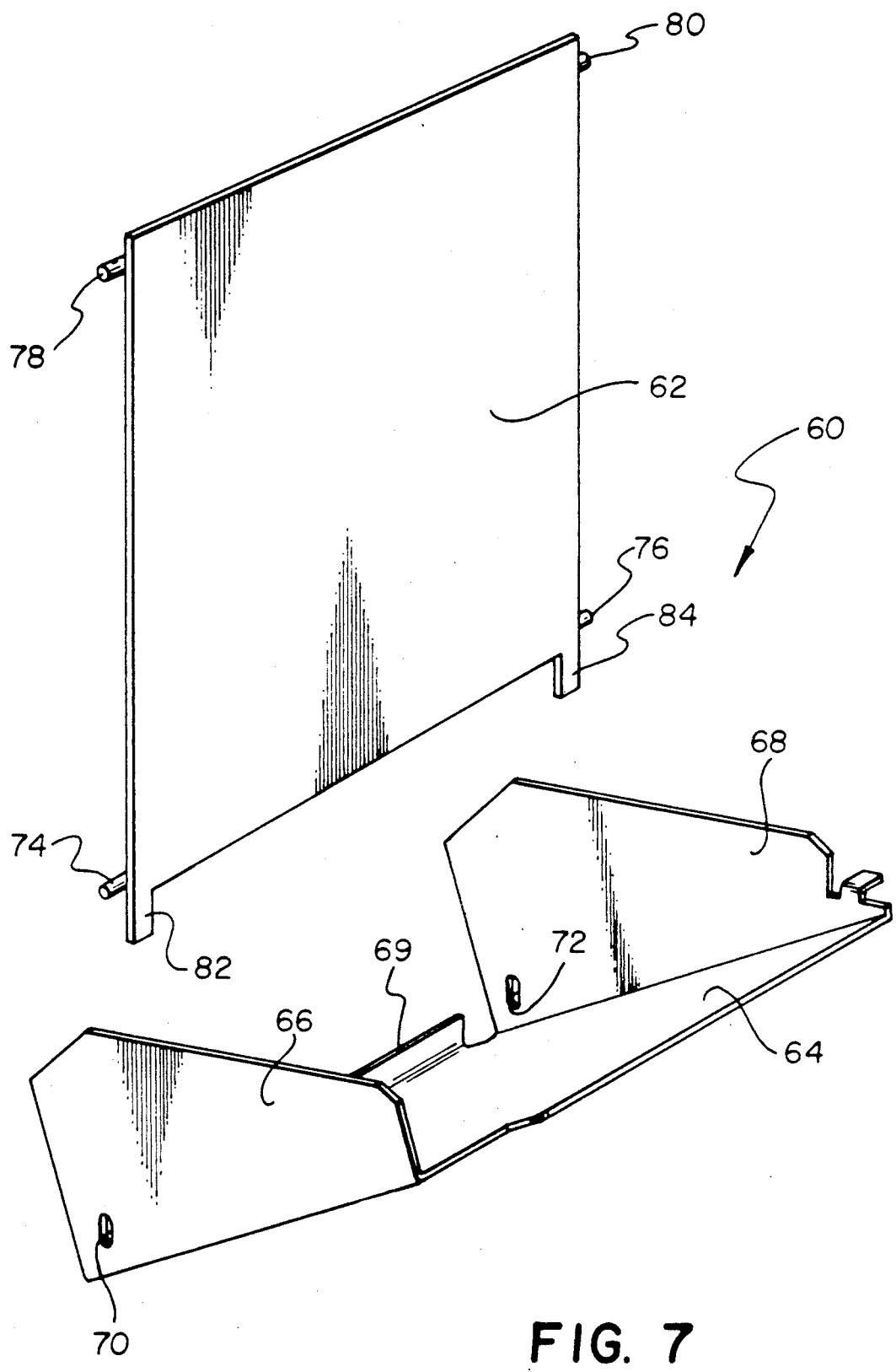
FIG. 7 is a diagrammatic perspective view of another embodiment of clamshell mechanism incorporated into the present invention.

Referring now to FIGS. 7-10, there is shown another embodiment of the present invention. As shown in FIG. 7, clamshell chute 60 includes flat backing plate 62 and film-carrying tray 64. Chute 60 is mounted in box 10 and serves to deliver a film sheet to, or remove a film sheet from a workstation where the film is processed.

Tray 64 has a pair of sheet retaining sides 66 and 68 and a sheet retaining end 69. Oppositely disposed slots 70 and 72 are respectively formed in sides 66 and 68. Plate 62 is nested between sides 66 and 68 and includes rods 74 and 76 affixed to the back of plate 62. Rods 74 and 76 ride in slots 70 and 72 respectively of tray 64 and serve to couple plate 62 and tray 64 to form film carrying chute 60.

Figure 8:
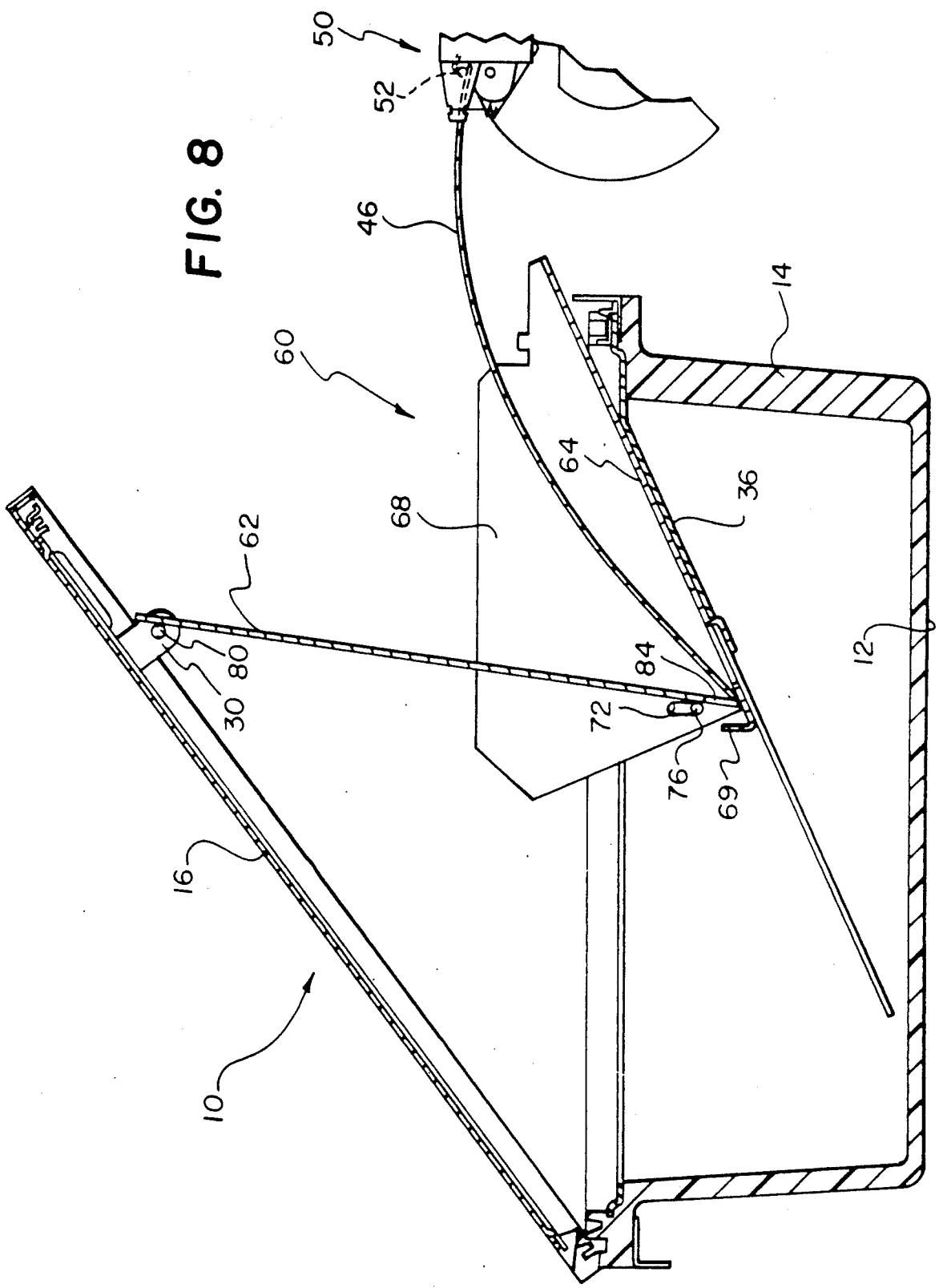

Plate 62 is also provided with rods 78 and 80 which are rotatably received in tabs 30 extending downwardly from lid 16 of box 10 (FIG. 8). Rods 78 and 80 serve as a hinge coupling plate 62 to lid 16. Tray 64 is slidably supported on ramp member 36 by suitable coupling means (not shown in FIGS. 8-10), such as the tongue 40 and slot 38 means shown in FIG. 2.

Figure 9:
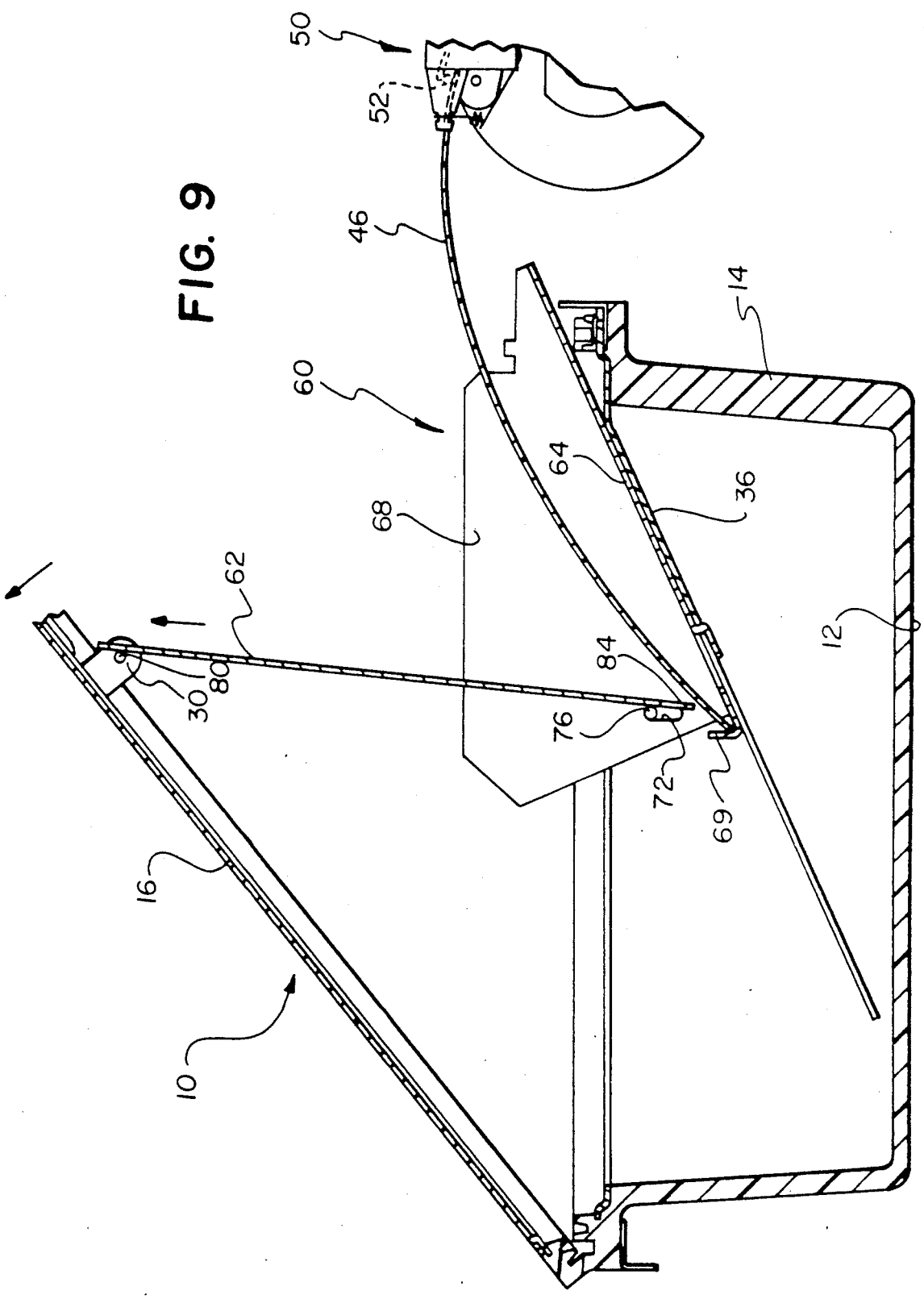

Referring to FIGS. 8-10, there will be described how chute 60 operates to positively remove a film sheet 46 from film writer 50. As shown in FIG. 8, lid 16 is partially open, chute 60 is open, with backing plate 62 resting on tray 64. Sheet film 46 is partially positioned within chute 60 with its rear portion abutting plate 62 and its front portion held by clamp 52 of film writer 50.

Next, as shown in FIG. 9, lid 16 of box 10 is fully opened, raising plate 62 out of contact with tray 64, and sliding tray 64 forwardly along ramp 36. In this position, rods 74, 76 reach the end of travel in respective slots 70, 72. Film 46, still clamped on film writer 50, is forced under clasping tabs 82 and 84 of plate until the rear edge of film 46 abuts rear end 69 of tray 64. This reaction is caused by the forward movement of chute 60 and the gap created between film clasping tabs 82, 84 and tray 64.

At this point lid 16 of box 10 is closed. As shown in FIG. 10, as lid 16 is closed by rotating it in a clockwise direction (arrow 86), the downward force (arrow 88) of plate 62 traps film 46 between film clasping tabs 82, 84 of plate 62 and tray 64. As the lid 16 is closed, chute 60 withdraws into box 10, positively removing film 46 from film writer 50 and returning it to box 10. An added benefit of this action is that the rotational movement of tabs 82, 84 assures that film 46 is moved completely to the rear of chute 60.

The invention has been described in detail with reference to the figures; however, it will be appreciated that variations and modifications are possible within the spirit and scope of the invention.

What is claimed is:

1. In a lighttight box for positively removing a photosensitive sheet from a workstation, the invention comprising:
    said box having a lid movable (a) between a closed position and a partially open position, (b) between said partially open position and a fully open position, and, (c) between said fully open position and said closed position;
    a tray located within said box for receiving a photosensitive sheet; and
    a member, coupled at one end to said lid and at its other end to said tray, said member being responsive (a) to movement of said lid between said closed position and said partially open position to move said tray from a position internal to said box forwardly to a position for receiving from a workstation the rearward portion of a photosensitive sheet buckling said sheet against a point where said member engages said tray; (b) to movement of said lid between said partially open position and said fully open position to move said tray to a fully forward position wherein said member is raised from said tray and said photosensitive sheet passes between said member and said tray substantially releasing said buckle; and (c) to movement of said lid between said fully open position and said closed position, to clasp said rear portion of said substantially unbuckled sheet between said member and said tray and to move said tray to said position internal to said box, wherein as said member and tray are moved to a position internal to said box they positively remove said clasped sheet from said workstation and return it to a lighttight position in said box.

2. The invention of claim 1 wherein said member has film clasping tabs at said other end thereof to clasp said photosensitive sheet between said tabs and said tray of positively remove said sheet from said workstation.

3. The invention of claim 1 further including a ramp member internal to said box and wherein said tray is mounted for slidable movement along said ramp member in response to movement of said lid.

4. The invention claim 1 wherein said tray includes sheet retaining sides having respective slots and a rearward sheet restraining end and wherein said other end of said member is rotatably and slidably coupled to said sides of said tray by means of rods riding in said slots.

* * * * *